(12) United States Patent
Aoki et al.

(10) Patent No.: US 12,288,354 B2
(45) Date of Patent: Apr. 29, 2025

(54) VEHICLE CONTROL DEVICE

(71) Applicant: TOYOTA JIDOSHA KABUSHIKI KAISHA, Toyota (JP)

(72) Inventors: Takayuki Aoki, Toyota (JP); Ryusuke Ohta, Toyota (JP); Daisuke Itagaki, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/411,281

(22) Filed: Jan. 12, 2024

(65) Prior Publication Data

US 2024/0354986 A1 Oct. 24, 2024

(30) Foreign Application Priority Data

Mar. 3, 2023 (JP) .................................. 2023-032804

(51) Int. Cl.
*G06T 7/73* (2017.01)
*G02B 27/01* (2006.01)
*G05D 1/246* (2024.01)
*G06F 18/25* (2023.01)
*G06T 7/11* (2017.01)
(Continued)

(52) U.S. Cl.
CPC ................ *G06T 7/73* (2017.01); *G06T 7/246* (2017.01); *G09G 3/001* (2013.01); *B60K 2360/177* (2024.01); *G02B 2027/014* (2013.01); *G02B 27/017* (2013.01); *G02B 2027/0183* (2013.01); *G05D 1/246* (2024.01); *G05D 1/2462* (2024.01); *G06F 18/253* (2023.01); *G06T 7/11* (2017.01); *G06T 7/194* (2017.01); *G06T 7/269* (2017.01); *G06T 7/70* (2017.01); *G06T 11/00* (2013.01); *G06T 19/006* (2013.01);
(Continued)

(58) Field of Classification Search
CPC . G06T 7/73; G06T 7/246; G06T 2207/30252; G06T 2207/30268; G06T 2207/30248; G06T 7/11; G06T 7/269; G06T 7/70; G06T 7/194; G06T 11/00; G06T 19/006; G09G 3/001; G09G 2340/0464; G09G 2380/10; B60K 2360/177; G02B 27/017; G02B 2027/0178; G02B 2027/0181; G02B 2027/0183; G02B 2027/014; G06F 16/7837; G06F 18/253; H04N 19/139; H04N 19/513; H04N 19/54; G05D 1/246; G05D 1/2462; G06V 20/20
See application file for complete search history.

(56) References Cited

U.S. PATENT DOCUMENTS

2019/0220238 A1 7/2019 Amano et al.
2022/0051449 A1* 2/2022 Kuo ...................... G06T 19/006

FOREIGN PATENT DOCUMENTS

JP 2019-125188 A 7/2019

* cited by examiner

*Primary Examiner* — Douglas M Wilson
(74) *Attorney, Agent, or Firm* — SoraIP, Inc.

(57) ABSTRACT

An extraction unit of a mobile terminal extracts a plurality of feature points from within a shooting range of a camera, based on shooting results of the camera provided on AR glasses. A determination unit determines a boundary between a first region corresponding to an inside of a vehicle cabin and a second region corresponding to an outside of the vehicle cabin within the shooting range of the camera based on discontinuity of movement vectors of the feature points when a vehicle moves. A specifying unit specifies a position of the AR glasses based on a determination result by the determination unit.

5 Claims, 4 Drawing Sheets

(51) Int. Cl.
  *G06T 7/246* (2017.01)
  *G06T 7/269* (2017.01)
  *G06T 7/70* (2017.01)
  *G06T 19/00* (2011.01)
  *G06V 20/20* (2022.01)
  *G09G 3/00* (2006.01)
  *G06T 7/194* (2017.01)
  *G06T 11/00* (2006.01)
(52) U.S. Cl.
  CPC ............... *G06T 2207/30252* (2013.01); *G06T 2207/30268* (2013.01); *G06V 20/20* (2022.01); *G09G 2380/10* (2013.01)

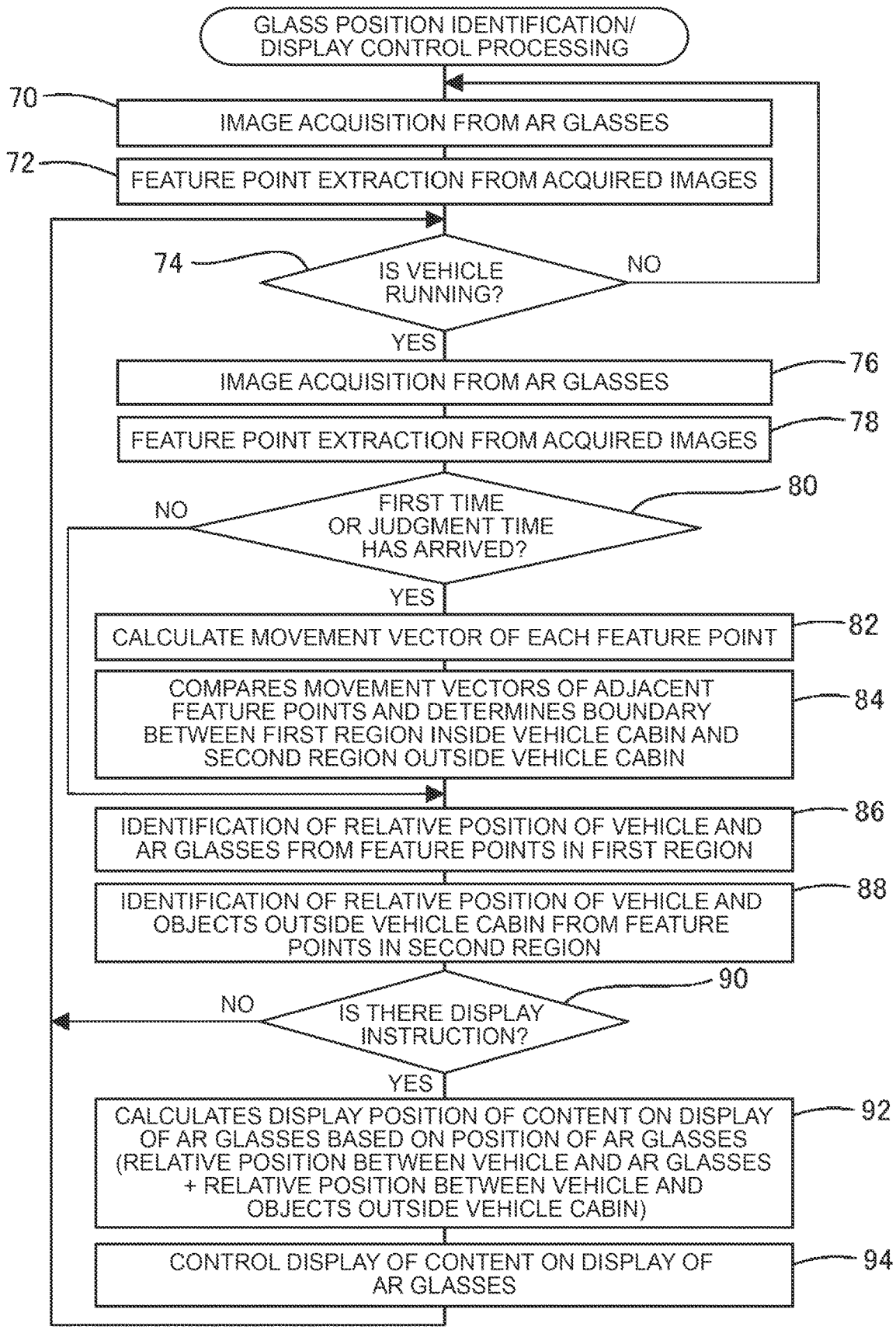

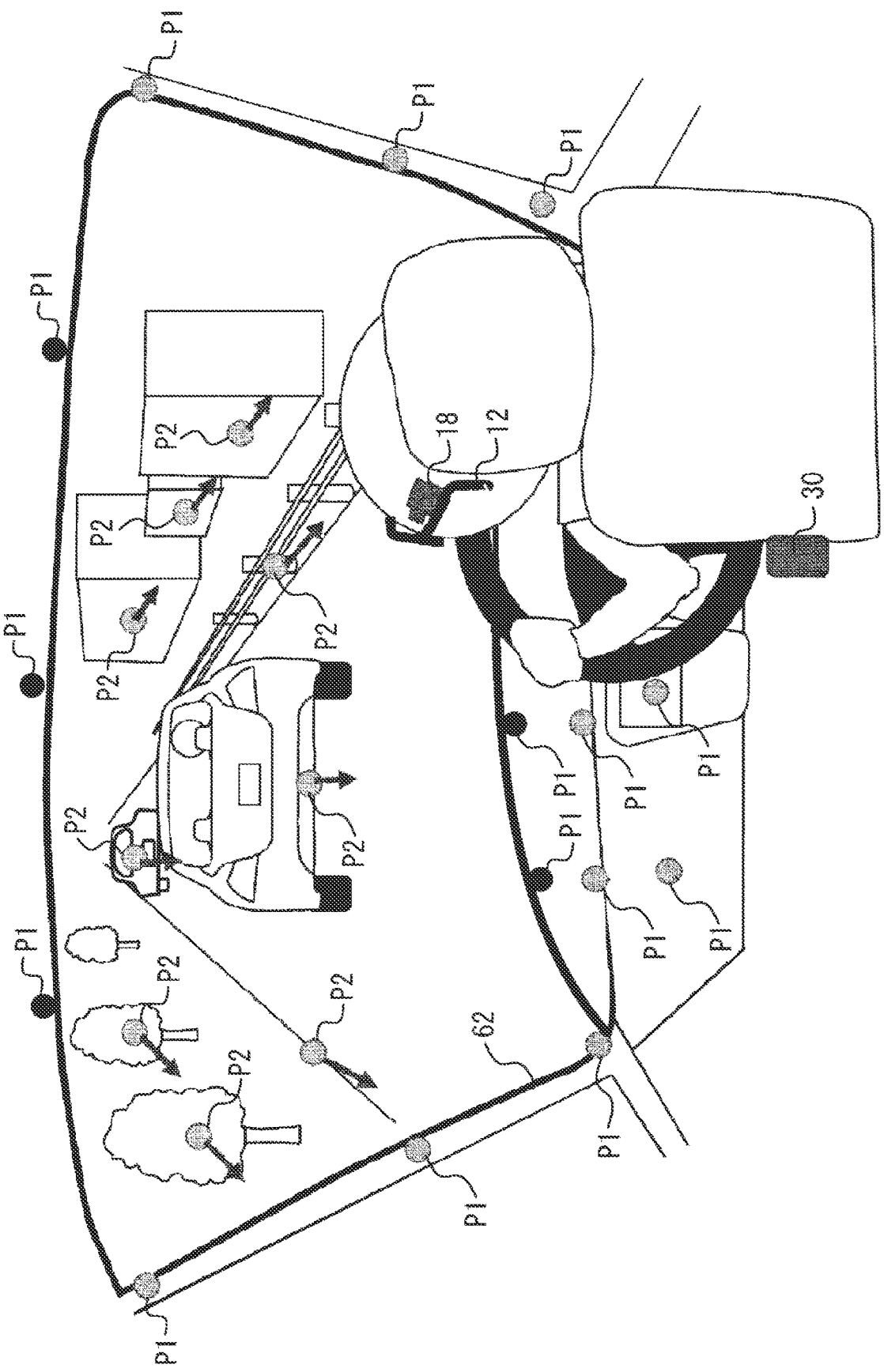

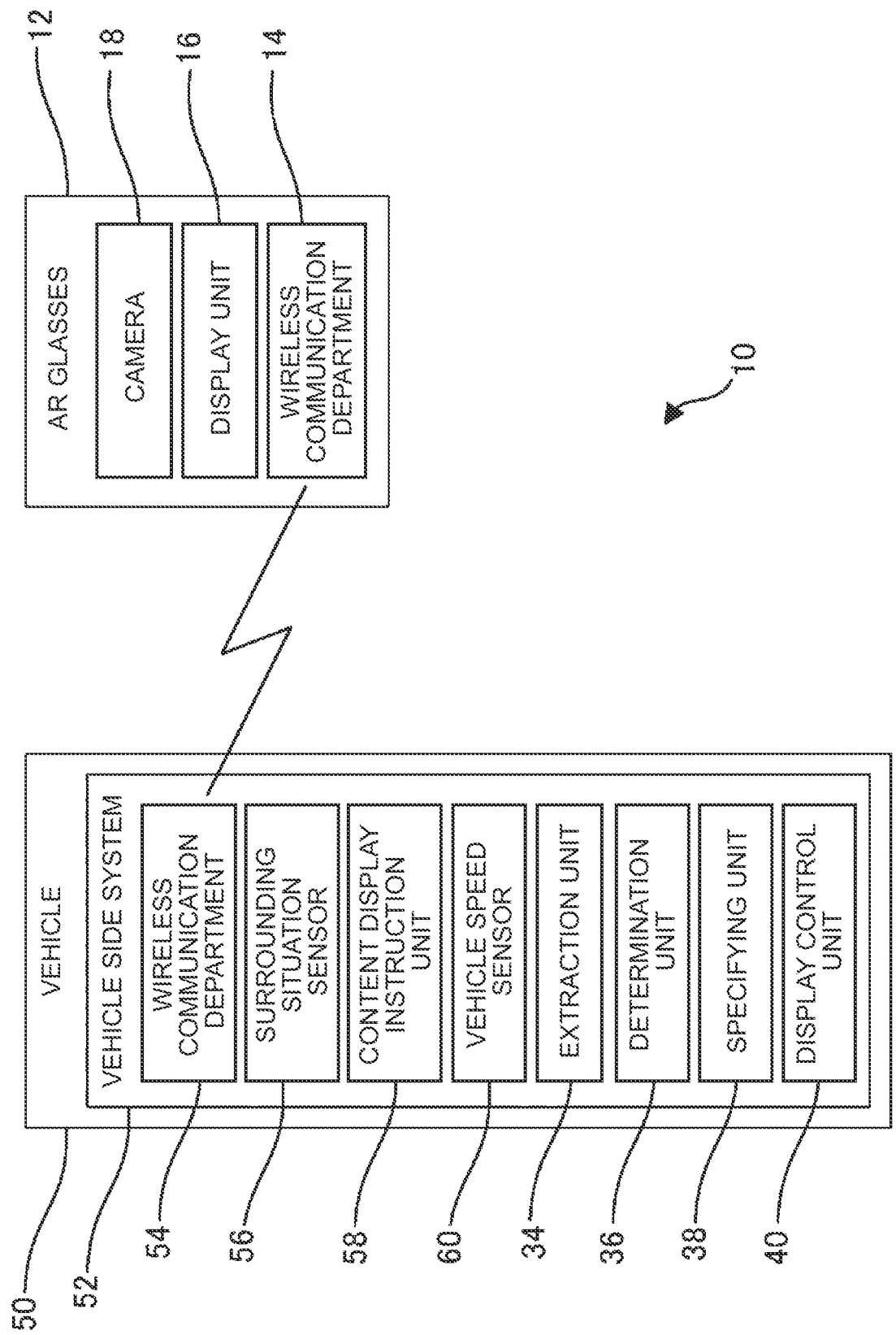

VEHICLE CONTROL DEVICE

CROSS-REFERENCE TO RELATED APPLICATION

This application claims priority to Japanese Patent Application No. 2023-032804 filed on Mar. 3, 2023 incorporated herein by reference in its entirety.

BACKGROUND

1. Technical Field

The present disclosure relates to a vehicle control device.

2. Description of Related Art

Japanese Unexamined Patent Application Publication No. 2019-125188 (JP 2019-125188 A) discloses a wearable terminal such as augmented reality (AR) glasses that are worn on the head of an occupant and are equipped with a display unit that is placed in front of the occupant in a worn state.

SUMMARY

In order to display contents on the display unit of the AR glasses so that the contents such as arrows are superimposed at any position on the scenery outside a vehicle cabin that the user views through the AR glasses, it is necessary to specify the position of the AR glasses (relative position between an object outside the vehicle cabin and the AR glasses). Here, when a sensor is provided in the AR glasses so that the object outside the vehicle cabin is within the detection range of the sensor, it is possible in principle to extract feature points from the detection result by the sensor, and to specify the position of the AR glasses from information on the extracted feature points.

However, the feature points extracted from the detection result by the sensor are a mixture of a first feature point corresponding to an object positioned inside the vehicle cabin (for example, a vehicle pillar), and a second feature point corresponding to an object positioned outside the vehicle cabin (for example, a pedestrian). Therefore, when the position of the AR glasses is specified using all the information on the feature points extracted from the detection result by the sensor, there is an issue that the accuracy of specifying the position of the AR glasses is significantly insufficient.

The present disclosure has been made in consideration of the above facts, and an object of the present disclosure is to obtain a vehicle control device that can accurately specify the position of AR glasses using a sensor provided in the AR glasses.

A vehicle control device according to a first aspect includes an extraction unit that extracts a plurality of feature points from within a detection range of a sensor provided in AR glasses based on a detection result by the sensor, a determination unit that determines a boundary between a first region corresponding to the inside of a vehicle cabin and a second region corresponding to the outside of the vehicle cabin within the detection range based on discontinuity of movement vectors of the feature points when a vehicle moves, and a specifying unit that specifies a position of the AR glasses based on a determination result by the determination unit.

In the first aspect, the feature points extracted by the extraction unit from within the detection range of the sensor provided in the AR glasses are a mixture of a first feature point corresponding to an object positioned inside the vehicle cabin, and a second feature point corresponding to an object positioned outside the vehicle cabin. However, the direction and the magnitude of the movement vector of the first feature point depends on the movement of a user wearing the AR glasses, whereas the direction and the magnitude of the movement vector of the second feature point correspond to the movement of the vehicle when the vehicle moves. Therefore, when the vehicle moves, the movement vectors of the feature points become discontinuous (at least one of the direction and the magnitude of the movement vector changes clearly) across the boundary between the region corresponding to the inside of the vehicle cabin and the region corresponding to the outside of the vehicle cabin within the detection range of the sensor.

The first aspect utilizes this, and the determination unit determines a boundary between a first region corresponding to the inside of a vehicle cabin and a second region corresponding to the outside of the vehicle cabin within the detection range of the sensor based on discontinuity of movement vectors of the feature points when a vehicle moves. A specifying unit specifies a position of the AR glasses based on a determination result by the determination unit. Thus, when specifying the position of the AR glasses by the specifying unit, it becomes possible to perform position specifying by separating the first feature point and the second feature point. Therefore, according to the first aspect, it is possible to accurately specify the position of the AR glasses using the sensor provided in the AR glasses.

In a second aspect, according to the first aspect, the determination unit determines that, among the feature points, a first feature point in which at least one of the direction and the magnitude of the movement vector does not correspond to a movement of the vehicle, and the first feature point with a minimum distance from a second feature point in which the direction and the magnitude of the movement vector correspond to the movement of the vehicle, is a feature point on the boundary.

In the second aspect, the feature points are distinguished between the first feature point or the second feature point based on whether the direction and the magnitude of the movement vector correspond to the movement of the vehicle, and the feature point among the first feature points with the minimum distance from the second feature point is determined to be the feature point on the boundary. Thus, the boundary between the first region corresponding to the inside of the vehicle cabin and the second region corresponding to the outside of the vehicle cabin can be accurately determined by a simple process.

In a third aspect, according to the first aspect, the specifying unit specifies a relative position between the vehicle and the AR glasses from information on a first feature point positioned in the first region within the detection range, and also specifies a relative position between the vehicle and an object outside the vehicle cabin from information on a second feature point positioned in the second region within the detection range.

In the third aspect, the positions of the AR glasses (the relative position between the object outside the vehicle cabin and the AR glasses) are divided into the relative position between the vehicle and the AR glasses, and the relative position between the vehicle and the object outside the vehicle cabin, the relative position between the vehicle and the AR glasses is specified from the information on the first feature point, and the relative position between the vehicle and the object outside the vehicle cabin is specified from the information on the second feature point. Thus, it is possible to accurately specify the position of the AR glasses using the sensor provided in the AR glasses.

In a fourth aspect, according to the third aspect, the specifying unit specifies a relative position between the vehicle and the AR glasses and specifies a relative position between the vehicle and an object outside the vehicle cabin using a self-position estimation (localization) algorithm in a simultaneous localization and mapping (SLAM) technology.

In the fourth aspect, the specifying unit specifies a relative position between the vehicle and the AR glasses and specifies a relative position between the vehicle and an object outside the vehicle cabin using a self-position estimation algorithm in the existing SLAM technology. This makes it possible to easily configure the specifying unit, and reduce the development cost of the vehicle control device according to the present disclosure.

A fifth aspect, according to the first aspect, further includes a display control unit that causes a content to be displayed in a position corresponding to a predetermined position in a display unit provided in the AR glasses such that, based on the position of the AR glasses, the position being specified by the specifying unit, the content is superimposed at the predetermined position on scenery outside the vehicle that is viewed through the AR glasses.

According to the fifth aspect, it is possible to superimpose the content to be displayed on the display unit of the AR glasses at any position on the scenery outside the vehicle that is viewed through the AR glasses.

The present disclosure has an effect that it becomes possible to accurately specify the position of AR glasses using a sensor provided in the AR glasses.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart showing an example of glass position estimation/display control processing;

FIG. 3 is a perspective view showing a user wearing AR glasses sitting in a vehicle seat; and FIG. 4 is a block diagram showing another schematic configuration of the vehicle control system.

DETAILED DESCRIPTION OF EMBODIMENTS

Figure 1:
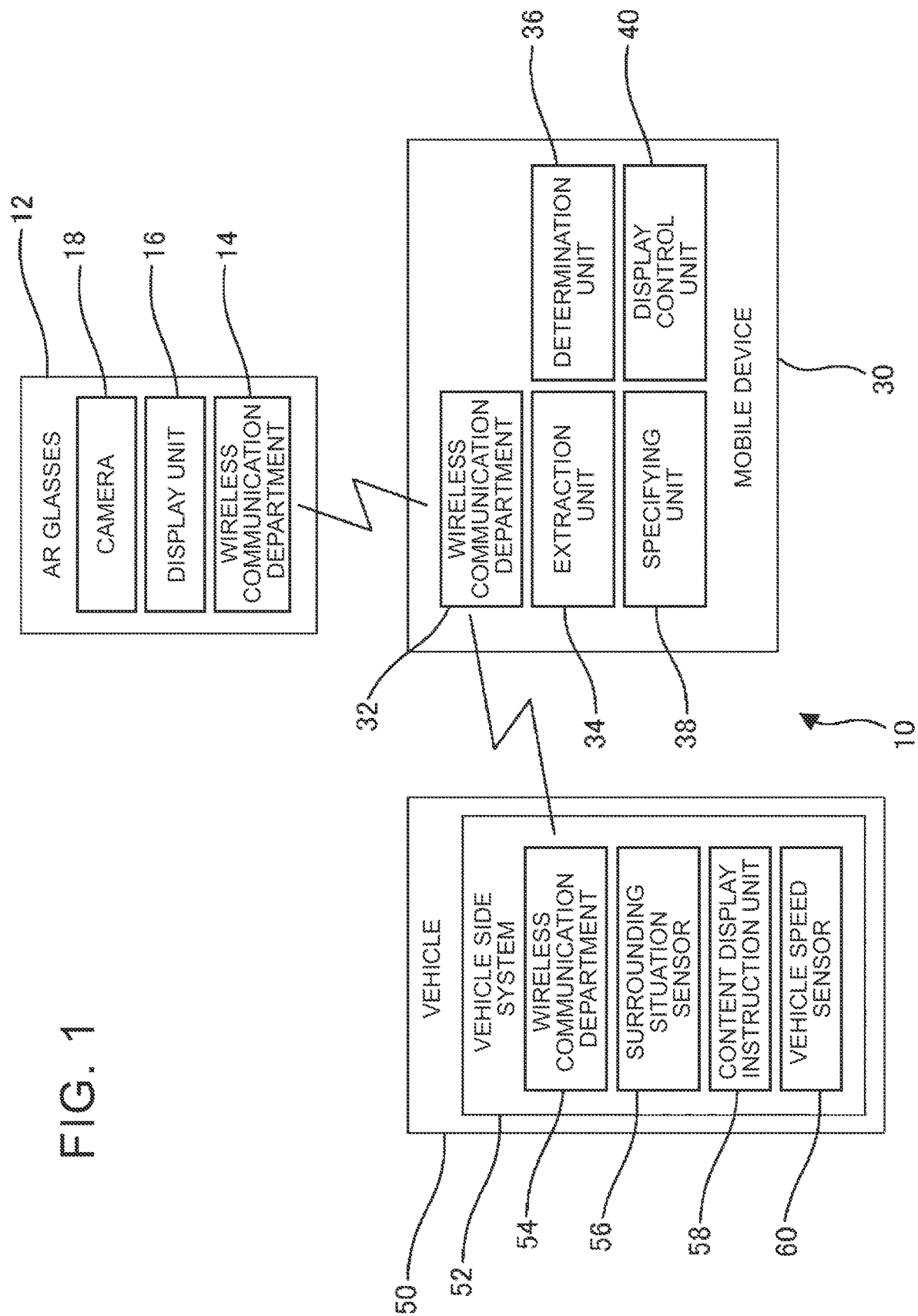
FIG. 1 is a block diagram showing a schematic configuration of a vehicle control system according to an embodiment.

Hereinafter, an example of an embodiment of the present disclosure will be described in detail with reference to the drawings. FIG. 1 shows a vehicle control system 10 according to this embodiment. The vehicle control system 10 includes AR glasses 12 worn on the user's head, a mobile terminal 30 such as a smartphone or tablet terminal carried by the user, and a vehicle-side system 52 mounted on the vehicle 50.

The AR glasses 12 include a wireless communication unit 14 that performs wireless communication with a mobile terminal 30 and the like, a display unit 16 (details will be described later), and a camera 18 that photographs the front of the AR glasses 12. Although not shown in the drawings, the AR glasses 12 include left and right optically transparent glass parts attached to a frame to which the bases of the left and right temples are attached. Display units 16 capable of displaying images are provided on the inner surfaces of the glass sections (the surfaces facing the eyes of the user wearing the AR glasses 12).

The display unit 16 is of a see-through type so that light that enters the glass unit from the outer surface of the glass unit is transmitted through the display unit 16 and enters the eyes of the occupant wearing the AR glasses 12. There is. As a result, when an image is displayed on the display unit 16, the image (virtual image) displayed on the display unit 16 is superimposed and visually recognized in the real field of view (for example, a real image in front of the vehicle 50) through the glass unit for the occupant wearing the AR glasses 12.

As shown in FIG. 3, in this embodiment, the camera 18 is attached to the temple of the AR glasses 12, but the arrangement of the camera 18 is not limited to this. The camera 18 may be attached to a glass part of the AR glasses 12.

The mobile terminal 30 includes a central processing unit (CPU), memory such as read only memory (ROM) and random access memory (RAM), non-volatile storage such as hard disk drive (HDD) and solid state drive (SSD), and a wireless communication unit 32. A control program is stored in the storage unit. The mobile terminal 30 functions as an extraction unit 34, a determination unit 36, a specifying unit 38, and a display control unit 40 when the CPU executes a control program, and performs a glass position specifying/display control process (FIG. 2) to be described later.

The extraction unit 34 extracts a plurality of feature points from within the shooting range of the camera 18 based on the shooting results of the camera 18 provided on the AR glasses 12. Further, the determination unit 36 determines, based on the discontinuity of the movement vectors of the plurality of feature points when the vehicle 50 moves, the boundary between a first region corresponding to the inside of the vehicle cabin and a second region corresponding to the outside of the vehicle cabin within the photographing range of the camera 18. The specifying unit 38 then identifies the position of the AR glasses 12 based on the determination result by the determination unit 36.

The display control unit 40 causes a content to be displayed in a position corresponding to a predetermined position (position instructed by the vehicle-side system 52) in a display unit 16 of the AR glasses 12 such that, based on the position of the AR glasses 12, the position being specified by the specifying unit 38, the content is superimposed at the predetermined position on scenery outside the vehicle that is viewed through the AR glasses 12. Note that in the embodiment shown in FIG. 1, the mobile terminal 30 functions as an example of a vehicle control device according to the present disclosure.

The vehicle-side system 52 includes one or more electronic control units (ECUs) (not shown), a wireless communication unit 54 that performs wireless communication with the mobile terminal 30, a surrounding situation sensor 56 that detects the state of the surrounding environment of the vehicle 50, and a vehicle speed sensor 60 that detects the speed of the vehicle 50. As the surrounding situation sensor 56, for example, at least one of a camera, radar, and LiDAR (light detection and ranging or laser imaging detection and ranging) is applied. Further, vehicle speed information indicating the vehicle speed of the vehicle 50 detected by the vehicle speed sensor 60 is transmitted to the mobile terminal 30 via the wireless communication unit 54 as appropriate (for example, periodically).

A predetermined ECU included in the vehicle-side system 52 functions as a content display instruction unit 58. The content display instruction unit 58 monitors whether the timing to display the content on the display unit 16 of the AR glasses 12 has arrived, and when it is determined that the timing has arrived, the content display instruction unit 58 transmits content information including the content type to be displayed on the display unit 16 of the AR glasses 12, three-dimensional position, etc. to the mobile terminal 30 via the wireless communication unit 54.

As an example, the content display instruction unit 58 may receive information about the planned travel route of the vehicle 50 acquired from a navigation device installed in the vehicle 50 and information about the planned travel route of the vehicle 50 acquired from a global navigation satellite system (GNSS) sensor installed in the vehicle 50. By checking the current position of, it is monitored whether or not the vehicle 50 is approaching a turning point. If it is determined that the vehicle 50 is about to make a turn, the content display instruction unit 58 sends content information to the mobile terminal 30 instructing to display an arrow indicating the turning direction of the vehicle superimposed on the road at the turning destination.

Next, as an effect of the present embodiment, a glass position identification/display control process executed by the mobile terminal 30 in a situation where the user rides the vehicle 50 and wears the AR glasses 12 on the head will be described with reference to FIG. 2. I will explain. Note that the glass position specifying/display control process is performed by, for example, a user riding in the vehicle 50 and wearing the AR glasses 12 performing a predetermined operation via the mobile terminal 30 to instruct activation of the glass position specifying/display control process. Execution is triggered by what has been done.

In step 70, the extraction unit 34 acquires image information representing an image captured by the camera 18 (an image including an area corresponding to the inside of the vehicle cabin and an area corresponding to the outside of the vehicle cabin) from the AR glasses 12. Further, in step 72, the extraction unit 34 extracts feature points from the image information acquired in step 70. In this embodiment, it is assumed that the vehicle 50 is stopped at the time when steps 70 and 72 are executed, and while the vehicle 50 is stopped, the feature points extracted in step 72 are placed inside the vehicle cabin. It is not distinguished whether the feature point corresponds to a located object or the feature point corresponds to an object located outside the vehicle cabin.

In the next step 74, the extraction unit 34 determines whether the vehicle 50 is traveling or not based on whether the vehicle speed of the vehicle 50 represented by the vehicle speed information acquired by the mobile terminal 30 from the vehicle-side system 52 is greater than 0 km/h. Determine whether. If the determination at step 74 is negative, the process returns to step 70, and steps 70 to 74 are repeated until the determination at step 74 is affirmed. Further, if the determination in step 74 is affirmative, the process moves to step 76. In step 76, the extraction unit 34 acquires the image information from the AR glasses 12, similar to step 70 described above, and in step 78, the extraction unit 34 acquires the image information, similar to step 72 described previously. Extract feature points from image information.

Furthermore, in the present embodiment, the determination processing (steps 82 and 84) for determining the boundary between the region inside the vehicle cabin corresponding to the inside of the vehicle cabin and the region outside the vehicle cabin corresponding to the outside of the vehicle cabin in the photographing range of the camera 18 is performed after step 80. The process is performed at a first timing (when the determination process is executed for the first time) and at a second timing when a predetermined time has elapsed since the determination process was previously executed. Therefore, in the next step 80, the determination unit 36 determines whether the current timing is the first timing or the second timing. Note that the predetermined time period that defines the second timing is not limited to being fixedly determined, but may be changed depending on the vehicle speed (for example, the predetermined time period may be decreased as the vehicle speed increases).

If the determination at step 80 is affirmative, the process moves to step 82. In step 82, the determination unit 36 calculates a movement vector for each feature point extracted in step 78. In FIG. 3, an example of a movement vector for each feature point is indicated by an arrow.

As an example, as shown in FIG. 3, the first feature point P1 located within the region inside the vehicle cabin has a large movement vector while the head of the user wearing the AR glasses 12 is stationary. When the motion vector becomes 0 and the user performs an action such as shaking his or her head, the movement vector changes in direction and magnitude according to the user's action. On the other hand, the direction of the movement vector of the second feature point P2 located in the region outside the vehicle cabin is from the vanishing point on the image taken by the camera 18 to the individual feature point P2, and the magnitude of the movement vector corresponds to the vehicle speed of the vehicle 50. Therefore, while the vehicle 50 is running, the direction and magnitude of the movement vector at each feature point become discontinuous across the boundary between the region inside the vehicle cabin and the region outside the vehicle cabin (at least one of the direction and magnitude of the motion vector clearly changes across the boundary).

In the next step 84, this is utilized, and based on the discontinuity of the movement vectors of the plurality of feature points when the vehicle 50 moves, the first region corresponding to the inside of the vehicle cabin and the outside of the vehicle cabin within the photographing range of the camera 18 are determined. A boundary with the corresponding second region is determined. Specifically, the process of determining the boundary between the first region and the second region is realized by, for example, the following process.

That is, first, the determination unit 36 determines whether or not the movement vector of each feature point has the direction and magnitude corresponding to the movement of the vehicle 50, thereby distinguishing each feature point between a first feature point in which at least one of the direction and magnitude of the movement vector does not correspond to the movement of the vehicle 50 and a second feature point in which the direction and magnitude of the movement vector correspond to the movement of the vehicle 50. The determination unit 36 also calculates the distance of each of the discriminated first feature points to the closest second feature point on the image taken by the camera 18.

Next, the determination unit 36 sets a search area smaller in area than the image taken by the camera 18 for the image taken, and the process of searching and extracting a first feature point existing within the set search area and the first feature point having the smallest distance to the second feature point is repeated while shifting the position of the search area on the captured image. Then, the determination unit 36 determines the first feature point extracted at each position in the search area and having the smallest distance from the second feature point to be the feature point on the boundary between the first region and the second region, and a boundary between the first region and the second region is set. As an example, in FIG. 3, an example of the boundary between the first region and the second region to be set is indicated by a bold line and is marked with a numeral "62." Through the above processing, the photographing range of the camera 18 is divided into a first region corresponding to the inside of the vehicle cabin and a second region corresponding to the outside of the vehicle cabin.

In step 86, the specifying unit 38 specifies the relative position of the vehicle 50 and the AR glasses 12 using the self-position estimation algorithm in the SLAM technique from the information of the first feature point in the first region. Furthermore, in the next step 88, the specifying unit 38 identifies the relative position of the vehicle and the object outside the vehicle cabin using the self-position estimation algorithm in the SLAM technology from the information of the second feature point in the second region.

In step 90, the display control unit 40 determines whether the content display instruction unit 58 of the vehicle-side system 52 has instructed the AR glasses 12 to display the content. If the determination at step 90 is negative, the process returns to step 74 and the processes from steps 74 to 90 are repeated. Further, if content information is received from the content display instruction unit 58, the determination in step 90 is affirmed and the process moves to step 92.

In step 92, the display control unit 40 controls the AR glasses 12 to superimpose and display content at a three-dimensional position indicated by the content information received from the vehicle-side system 52 on the real image that the user views through the AR glasses 12. The display position of the content on the display unit 16 is calculated. This display position calculation is performed based on the relative position between the vehicle 50 and the AR glasses 12 specified in the previous step 86, and the relative position between the vehicle and the object outside the vehicle cabin specified in the previous step 88. This is performed based on the relative position between the object outside the vehicle cabin and the AR glasses 12.

In step 94, the display control unit 40 controls the AR glasses 12 so that the content is displayed at the display position calculated in step 92 on the display unit 16 of the AR glasses 12. As a result, the content (virtual image) displayed on the display unit 16 of the AR glasses 12 is visually perceived as being superimposed on the real image that the user sees through the AR glasses 12 at the three-dimensional position indicated by the content information. It turns out. After the process of step 94 is performed, the process returns to step 74 and the process from step 74 onward is repeated.

As described above, in the present embodiment, the extraction unit 34 extracts a plurality of feature points from within the photographing range of the camera 18 based on the photographing result by the camera 18 provided on the AR glasses 12. Further, the determination unit 36 determines, based on the discontinuity of the movement vectors of the plurality of feature points when the vehicle 50 moves, the boundary between a first region corresponding to the inside of the vehicle cabin and a second region corresponding to the outside of the vehicle cabin within the photographing range of the camera 18. The specifying unit 38 then identifies the position of the AR glasses 12 based on the determination result by the determination unit 36. This makes it possible to accurately specify the position of the AR glasses 12 using the camera 18 provided on the AR glasses 12.

Further, in the present embodiment, the determination unit 36 determines that, among the feature points extracted by the extraction unit 34, a first feature point in which at least one of the direction and magnitude of the movement vector does not correspond to a movement of the vehicle 50, and the first feature point with a minimum distance from a second feature point in which a direction and magnitude of the movement vector correspond to the movement of the vehicle 50, is a feature point on the boundary between the first region corresponding to the inside of the vehicle cabin and the second region corresponding to the outside of the vehicle cabin. Thus, the boundary between the first region corresponding to the inside of the vehicle cabin and the second region corresponding to the outside of the vehicle cabin can be accurately determined by a simple process.

Further, in the present embodiment, the specifying unit 38 identifies the relationship between the vehicle 50 and the AR glasses 12 based on the information of the first feature point located in the first region corresponding to the inside of the vehicle cabin within the photographing range of the camera 18. The relative position of the vehicle 50 and the object outside the vehicle cabin is determined based on the information of the second feature point located in the second region corresponding to the outside of the vehicle cabin within the photographing range of the camera 18. Identify. Thereby, the position of the AR glasses 12 can be specified with high accuracy using the camera 18 provided on the AR glasses 12.

Furthermore, in the present embodiment, the specifying unit 38 identifies the relative position between the vehicle 50 and the AR glasses 12 and the relative position between the vehicle 50 and an object outside the vehicle cabin using an algorithm for self-position estimation in the SLAM technology. Thereby, the specifying unit 38 can be easily configured, and the cost for developing a control program for causing the mobile terminal 30 to function as a vehicle control device according to the present disclosure can be reduced.

Furthermore, in the present embodiment, the display control unit 40 positions the content at a predetermined position relative to the scenery outside the vehicle that is visually recognized through the AR glasses 12 based on the position of the AR glasses 12 specified by the specifying unit 38. The content is displayed at a position corresponding to a predetermined position on the display unit 16 provided on the AR glasses 12 so as to be superimposed. Thereby, the content to be displayed on the display unit 16 of the AR glasses 12 can be superimposed at any position on the scenery outside the vehicle that is visually recognized through the AR glasses 12.

Note that in the embodiment described above, a mode in which the camera 18 provided on the AR glasses 12 is applied as an example of a sensor in the present disclosure has been described. However, the sensor in the present disclosure may be, for example, a lidar or a distance image sensor.

Further, in the above embodiment, a mode has been described in which the relative position between the vehicle and an object outside the vehicle cabin is identified from an image detected by the camera 18 provided in the AR glasses 12, but the present disclosure is limited to this. It's not a thing. For example, the relative position between the vehicle and an object outside the vehicle cabin may be specified based on the results of detecting the front of the vehicle using a sensor such as a camera or a lidar mounted on the vehicle.

Further, in the above embodiment, a mode has been described in which the mobile terminal 30 functions as an example of the vehicle control device according to the present disclosure, but the present disclosure is not limited to this. As an example, as shown in FIG. 4, any ECU included in the vehicle-side system 52 may function as an example of the vehicle control device according to the present disclosure. In this case, the ECU may be configured to communicate directly with the AR glasses 12, as shown in FIG. 4, so that the mobile terminal 30 can be omitted.

What is claimed is:

1. A vehicle control device comprising a processor configured to:
   acquire image information from AR glasses of a user of a vehicle, the image information representing an image captured by a sensor provided in the AR glasses;
   extract a plurality of feature points from within a detection range of the sensor based on a detection result by the sensor;
   determine a boundary between a first region corresponding to an inside interior of a vehicle cabin of the vehicle and a second region corresponding to an exterior of the vehicle cabin within the detection range based on discontinuity of movement vectors of the plurality of feature points as the vehicle is moving;
   specify a position of the AR glasses relative to the vehicle from information on first feature points out of the plurality of feature points, the first feature points being positioned in the first region within the detection range;
   specify a position of the vehicle relative to an object outside the vehicle cabin from information on a second feature point out of the plurality of feature points, the second feature point being positioned in the second region within the detection range; and
   specify a position of the AR glasses with respect to the object outside the vehicle cabin based on the position of the AR glasses relative to the vehicle and the position of the vehicle relative to the object outside the vehicle cabin.

2. The vehicle control device according to claim 1, wherein the processor is further configured to:
   set a search area in the detection range;
   select a first feature point out of the first feature points for the search area, wherein
      a distance from the selected first feature point to the second feature point is the smallest,
      at least one of a direction or a magnitude of a first movement vector of the selected first feature point does not correspond to a movement of the vehicle, and
      a direction and a magnitude of a second movement vector of the second feature point corresponds to the movement of the vehicle; and
   set the selected first feature point as a feature point on the boundary.

3. The vehicle control device according to claim 1, wherein the processor is further configured to specify the position of the AR glasses relative to the vehicle and the position of the vehicle relative to the object outside the vehicle cabin using a self-position estimation algorithm in a SLAM technology.

4. The vehicle control device according to claim 1, wherein
   the AR glasses include a display, and
   the processor is further configured to cause content to be displayed on the display based on the position of the AR glasses with respect to the object outside the vehicle cabin such that the content is superimposed at a predetermined position on scenery outside the vehicle that is viewed through the AR glasses.

5. The vehicle control device according to claim 2, wherein the processor is further configured to
   shift a position of the search area within the detection range, and
   repeat the selection of the first feature point for the shifted position.

* * * * *